(12) United States Patent
Hipskind

(10) Patent No.: US 6,344,100 B1
(45) Date of Patent: Feb. 5, 2002

(54) METHOD OF RESURFACING A ROLL

(76) Inventor: Robert A. Hipskind, 1634 Bridal Trail, Rock Hill, SC (US) 29732

( * ) Notice: Subject to any disclaimer, the term of this patent is extended or adjusted under 35 U.S.C. 154(b) by 0 days.

(21) Appl. No.: 09/408,150

(22) Filed: Sep. 29, 1999

(51) Int. Cl.$^7$ ................................................. B21D 5/00
(52) U.S. Cl. ........................ 156/94; 156/195; 156/199; 156/187; 156/247; 29/895.1; 29/895.211; 29/895.23
(58) Field of Search ................................. 156/187, 195, 156/247, 192, 199, 94; 29/895.1, 895.2, 895.21, 895.211, 895.23, 895.3, 402.03, 402.04, 402.19, 402.11, 402.09, 402.12, 402.14, 402.16, 402.18; 72/44, 47, 176, 199

(56) References Cited

U.S. PATENT DOCUMENTS

| | | | | |
|---|---|---|---|---|
| 1,942,304 A | * | 1/1934 | Mylting | 29/402.16 |
| 2,157,456 A | | 5/1939 | Koyemann | |
| 2,197,032 A | | 4/1940 | Dickey | |
| 2,438,296 A | | 3/1948 | Nassimbene | |
| 2,976,738 A | | 3/1961 | Bascom | |
| 3,007,231 A | * | 11/1961 | Garver | 29/895.211 |
| 3,188,734 A | * | 6/1965 | Davis, Jr. | 72/46 |
| 3,304,757 A | * | 2/1967 | Achler et al. | 72/199 |
| 3,358,898 A | * | 12/1967 | Medkeff et al. | 156/94 |
| 3,544,423 A | | 12/1970 | Rothermel | |
| 4,172,160 A | | 10/1979 | Stoner, III | |
| 4,210,682 A | | 7/1980 | Davis et al. | |
| 4,600,599 A | | 7/1986 | Wallsten | |
| 4,726,208 A | * | 2/1988 | Saunders | 72/47 |
| 4,794,680 A | | 1/1989 | Meyerhoff et al. | |
| 4,850,089 A | | 7/1989 | Monfort et al. | |
| 4,875,262 A | | 10/1989 | DeGrave | |
| 4,901,843 A | | 2/1990 | Lashyro | |
| 4,964,203 A | | 10/1990 | Lioy et al. | |
| 4,970,768 A | | 11/1990 | Lioy et al. | |
| 4,974,540 A | * | 12/1990 | Loslever | 118/223 |
| 4,977,656 A | | 12/1990 | Lioy et al. | |
| 4,978,583 A | | 12/1990 | Wakui et al. | |
| 5,141,818 A | | 8/1992 | Lienert et al. | |
| 5,407,702 A | | 4/1995 | Smith et al. | |
| 5,456,946 A | | 10/1995 | Snellman | |
| 5,516,549 A | | 5/1996 | Jasenof et al. | |
| 5,784,961 A | * | 7/1998 | Lorig et al. | 29/895.23 |
| 6,074,192 A | * | 6/2000 | Mikkelsen | 29/895.21 |

* cited by examiner

Primary Examiner—Sam Chuan Yao
Assistant Examiner—Barbara J. Musser
(74) Attorney, Agent, or Firm—Kennedy Covington Lobdell & Hickman LLP

(57) ABSTRACT

A method of resurfacing a traction roll to provide a friction surface to replace a worn surface. A supply reel of metal strip material is continuously unwound from a supply reel and rewound on a take-up reel. Between the reels, the unwound strip passes through a treating station at which a surface of the strip is prepared for coating and is then coated by one or two sprays of various types of thermal spray equipment as the applicator, with a polymer coating sometimes applied as a top coating. The take-up reel with the coated strip is then transported to a facility where the traction roll is located. The traction roll is then prepared for winding of the strip thereonto. The strip is wound helically onto the traction roll and secured thereto by doublesided adhesive tape disposed between and attached to the roll surface and the metal strip. In a modification, the strip is fed through the treating location in contact with an arcuate surface of a mandrel to impart curvature to the strip. This is also accomplished in a further modification in which the strip is fed spirally over a rotating cylinder. Both the mandrel and the cylinder provide a heat sink function as well as imparting a curvature to the treated strip to facilitate winding on the take-up reel and to facilitate subsequent winding on the traction roll. In yet another embodiment, the treatment of the surface of the metal strip is performed by sequentially immersing the unwound strip between the supply reel and the take-up reel in a plurality of treating baths.

27 Claims, 5 Drawing Sheets

METHOD OF RESURFACING A ROLL

FIELD OF THE INVENTION

The present invention relates to resurfacing of rolls that are used in manufacturing equipment and have a surface texture required for the particular manufacturing operation in which the roll is used.

BACKGROUND OF THE INVENTION

Many manufacturing processes utilize equipment having rolls with textured surfaces, such as traction rolls used in various textile manufacturing equipment to wind up or control the feed of a traveling textile web as it progresses through the equipment. Surface textured rolls are also used in other manufacturing equipment such as in the steel industry. The surface texture on such rolls may be a friction providing surface such as by narrow strips of sandpaper helically wrapped around and glued to the surface of the roll or various types of thermal sprayed abrasion resistant coatings applied directly to the surface of the roll.

These surface textured rolls are subject to wear during use and must be replaced or resurfaced. This results in the considerable expense of having to purchase a new roll or the expense and out-of-service time of having the roll shipped to a resurfacing facility or the frequent removing and replacing of the sandpaper surface at the facility at which the roll is being used. Also, in some manufacturing facilities, the change from handling one material to another requires the substitution of a roll with a different type or grade of surface texture. This requires the user to have an inventory of costly rolls.

SUMMARY OF THE INVENTION

By the present invention, a method is provided for resurfacing a roll that is used in equipment at a manufacturing facility by wrapping a strip of surface textured metal onto the roll at the manufacturing facility, with the surface textured strip having been textured at a remote location. This is accomplished in the present invention by providing a supply reel of a narrow, thin metal strip at a treating location remote from the manufacturing location, continuously unwinding the metal strip from the supply reel at the treating location for continuous travel through a treating station and subsequently rewinding onto a takeup reel with the metal strip being surface treated as it travels through the treating station. The reel of surface treated metal strip is transported to the manufacturing facility at which the roll to be surfaced is located and the metal strip is unwound from the takeup reel and helically wrapped and attached onto the surface of the roll.

In specific embodiments, the metal strip is fed through the treating location in contact with an arcuate surface of a mandrel or helically around a rotating cylinder to impart curvature to the strip as it is treated, with the curvature being in the same general direction as the curvature of the treated strip on the takeup reel. The surface treated strip is then fed directly from the mandrel or cylinder to the takeup reel so that the curvature imparted will remain, at least to some extent, thereby facilitating conformance of the strip to the reel and subsequently to the roll when wrapped thereon. Alternatively, the surface treating can be accomplished by immersing the unwound strip sequentially in a plurality of treating baths.

In a preferred embodiment, the surface treating to the strip is accomplished by applying coating material using various types of thermal spray equipment as the applicator.

The attachment of the strip to the roll to be resurfaced may be an adhesive attachment. In one embodiment a double sided adhesive tape is applied for disposition between and adherence to the surface of the roll and the metal strip being wrapped on the roll.

Further, in the preferred embodiment the surface treating creates a friction texture on the surface of the metal strip, which can be accomplished by coating using various types of thermal spray equipment as the applicator.

Thus, by the present invention, a roll with a textured surface can be resurfaced without the expense of shipping and out-of-service time at the manufacturing facility with a relatively short downtime and without the expense of having to purchase a new roll. Also, importantly, a roll can be resurfaced at the manufacturing facility readily for changing over the use of the roll to a different condition or application, thereby eliminating the need for an inventory of rolls having different surface texture.

DETAILED DESCRIPTION OF THE PREFERRED EMBODIMENTS

The present invention will be described in detail in regard to a preferred use of the method for resurfacing traction rolls having friction surfaces as used in various types of textile equipment where a traction roll engages a traveling web substrate to wind up or control the feed of the substrate as it travels in engagement with the roll. It should be understood, however, that the invention has application to various other types of equipment that use rolls having particular surface texture or condition that is subject to wear after prolonged periods of use.

Figure 1:
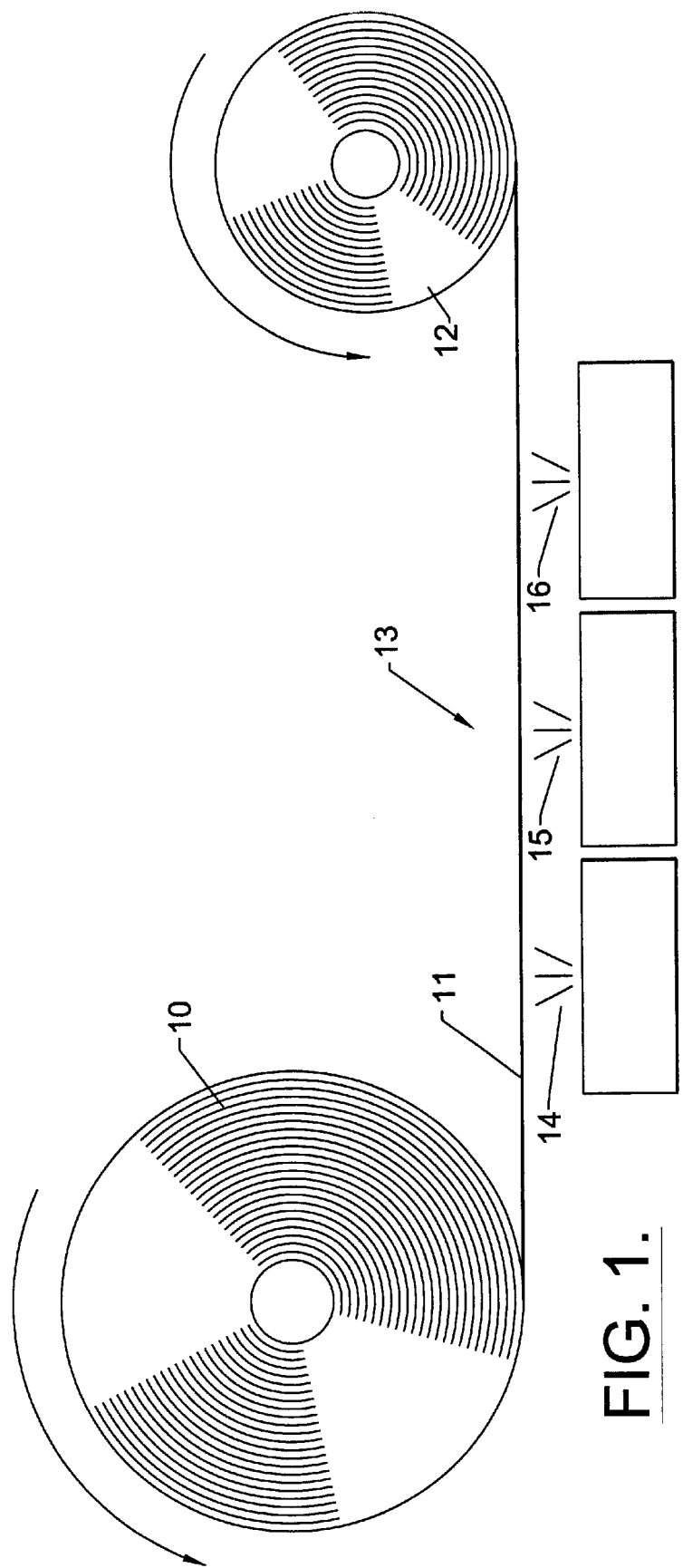
FIG. 1 is a schematic illustration of the surface treating of a metal strip in accordance with one preferred embodiment of the present invention.
Figure 2:
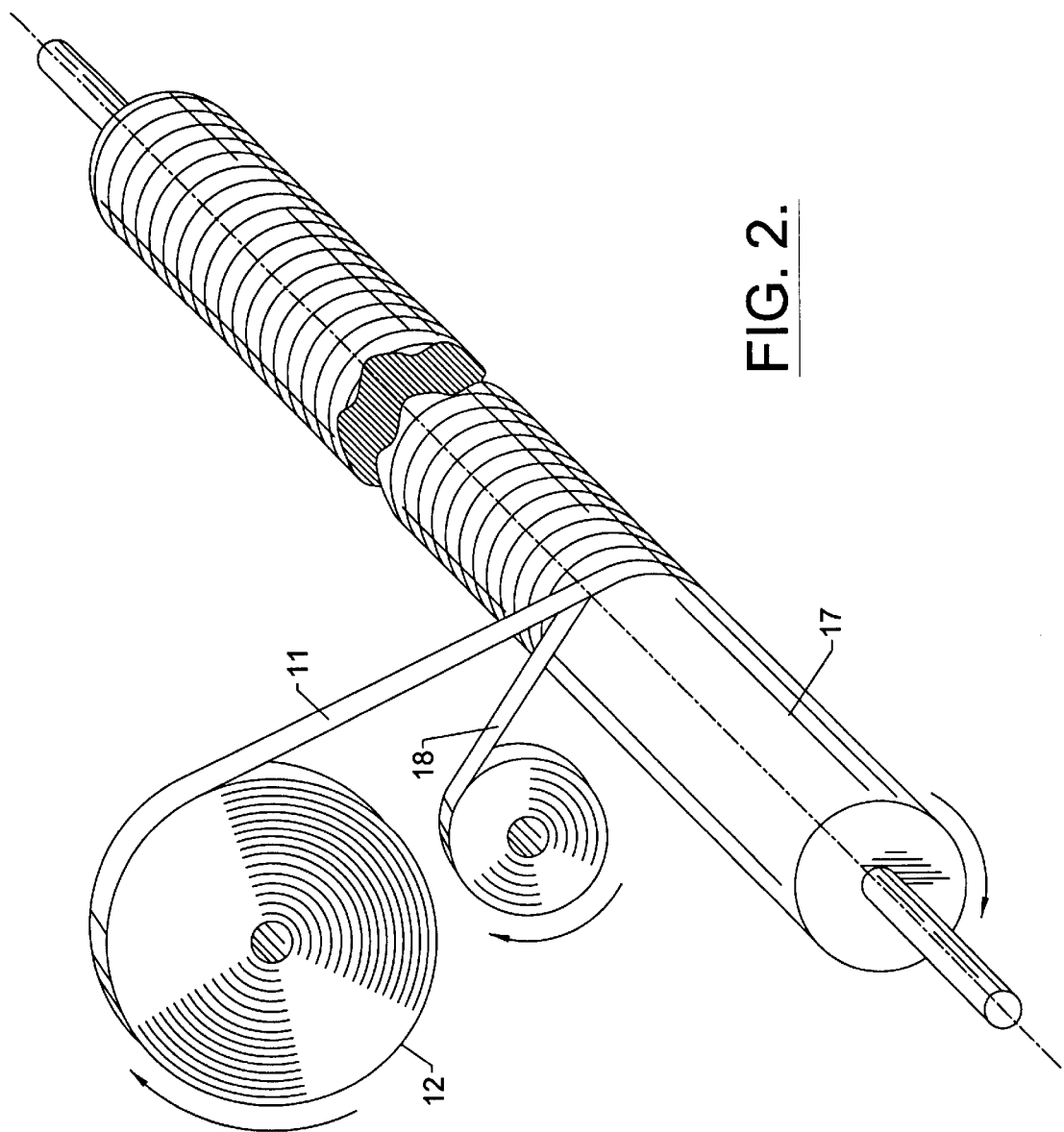
FIG. 2 is a perspective schematic illustration of the wrapping of surface treated metal strip on a roll in accordance with a preferred embodiment of the present invention.

In the preferred embodiment illustrated in FIGS. 1 and 2, a supply reel 10 of a strip 11 of stainless steel of, for example, one inch wide strip stock of 16 gauge thickness wound on a six inch to 12 inch diameter core is provided at a treating location 13. The thickness and width may very as desired. For example, a thicker strip can be used for greater heat dissipation or a thinner strip can be used for better flexibility. The strip 11 is unwound from the supply reel 10 and rewound onto a takeup reel 12 of similar dimension. Between the supply reel 10 and the takeup reel 12 the strip is subjected to surface treatment in the treatment location 13. As illustrated in FIG. 1, the strip 11 travels in a straight line tangent to both the supply reel 10 and the takeup reel 11.

The surface treating to the strip may be in any conventional manner to provide the requisite surface texture on the strip. As illustrated in FIG. 1, the strip 11 is first subjected to a surface preparation application 14, which may be a blast of grit. It then travels through two sequential coating applications 15 and 16. In the preferred embodiment, the coating applications are performed using known types of thermal spray equipment, such as production coating systems marketed by TAFA Incorporated of Concord, N.H., an example being Model JP-5000 HP HVOF gun. The coating material may be tungsten carbide, chrome carbide, nickel chrome or any other hard metal or other material that can be thermal sprayed. Depending on the texture desired, one coating application may be sufficient. In the preferred embodiment, two coating applications are used, but in some circumstances only one coating application may be necessary and in other instances more than two coatings may be desired. In some uses, the surface treatment may include spraying a polymer onto the treated strip to provide a top coat that facilitates release of any particles deposited from the material passing over the roll during use.

Various other forms of surface treating may be utilized within the scope of the present invention depending on the type of surface desired, and the strip may be of other suitable metal.

The surface treating of the metal strip is intended to be performed by a thermal spray coating company at a facility that is remote from the manufacturing facility at which the equipment is located in which the roll to be resurfaced is incorporated. Therefore, the takeup reel 12 of surface treated metal strip 11 is transported to the manufacturing facility to be applied to the roll to be resurfaced. A typical traction roll to be resurfaced may be 60" to 80" in length and 6" to 10" in diameter. Before the strip is applied to the roll, the roll will normally be prepared or conditioned for attachment of the strip. Such rolls sometimes are covered with sandpaper and the worn sandpaper should be removed before attachment of the metal strip. This is done by applying a solvent to loosen the glue and then peel off the paper. Other preparation procedures could include grit blasting. In some instances, no preparation of the roll is necessary to apply the metal strip.

The metal strip 11 is applied to the roll 17 by spirally wrapping the strip onto the surface of the roll and rotating the roll as the reel of surface treated strip material is advanced axially at a rate to apply the strip in a tight spiral without appreciable gaps, although in some applications, substantial gaps or spaced wrapping may be acceptable and/or expedient.

As the strip 11 of material is wrapped on the roll 17, it is attached to the roll, which, in the preferred embodiment, is accomplished by using a double sided adhesive tape 18 applied to the roll 17 simultaneously and spirally in advance of the wrapping of the metal strip 11. Alternatively, hook and loop fasteners or glue or any other suitable attaching means may be utilized.

A thermal sprayed coating as described above may provide a friction surface having more wear characteristics that may be in the order of 10 or more times the life of sandpaper.

Figure 3:
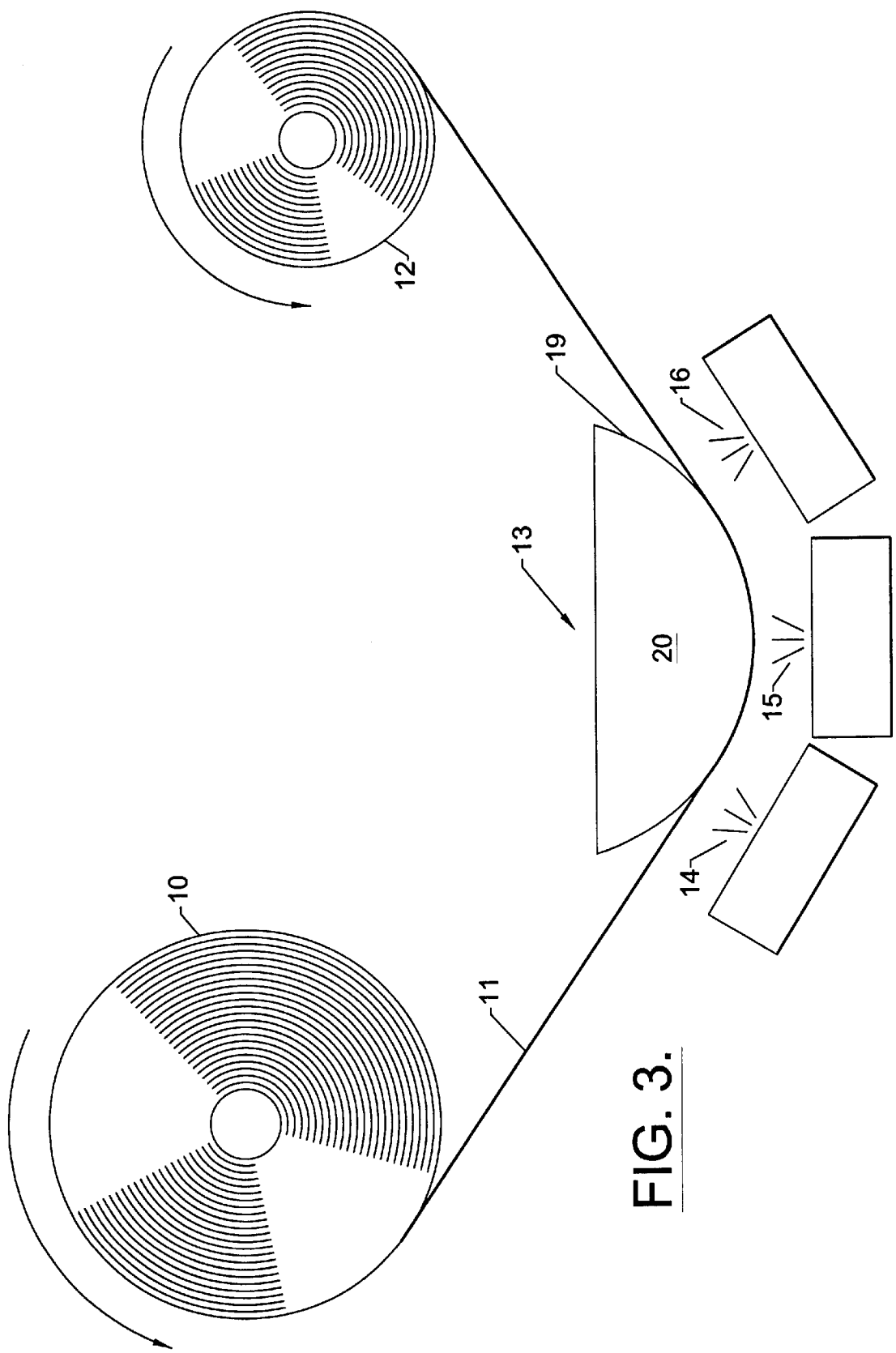
FIG. 3 is a schematic illustration of another embodiment of the surface treating of a metal strip according to the present invention.

A modification of the surface treating is illustrated in FIG. 3. In this modification, the unwinding, treating and rewinding is identical to that illustrated in FIG. 1 with the exception that, as the strip 111 passes through the treating location 13, it travels in contact with an arcuate surface 19 of a mandrel 20 that imparts curvature to the strip as it is treated, with the heat of application and the curvature of the mandrel 20 resulting in some lasting curvature. The curvature of the arcuate surface 19 of the mandrel 20 is in the same general direction as the curvature of the treated strip 11 on the takeup reel 12. The treated strip 11 is fed directly and without tension or with some slack from the mandrel 20 to the takeup reel 12 so that at least some of the curvature imparted by the mandrel 20 will facilitate the winding of the strip 11 on the takeup reel 12 and will facilitate conformance of the strip 11 when it is subsequently wrapped on the roll 17. This mandrel 20 can also be utilized as a heat sink to dissipate some of the heat generated in the treating process.

Figure 4:
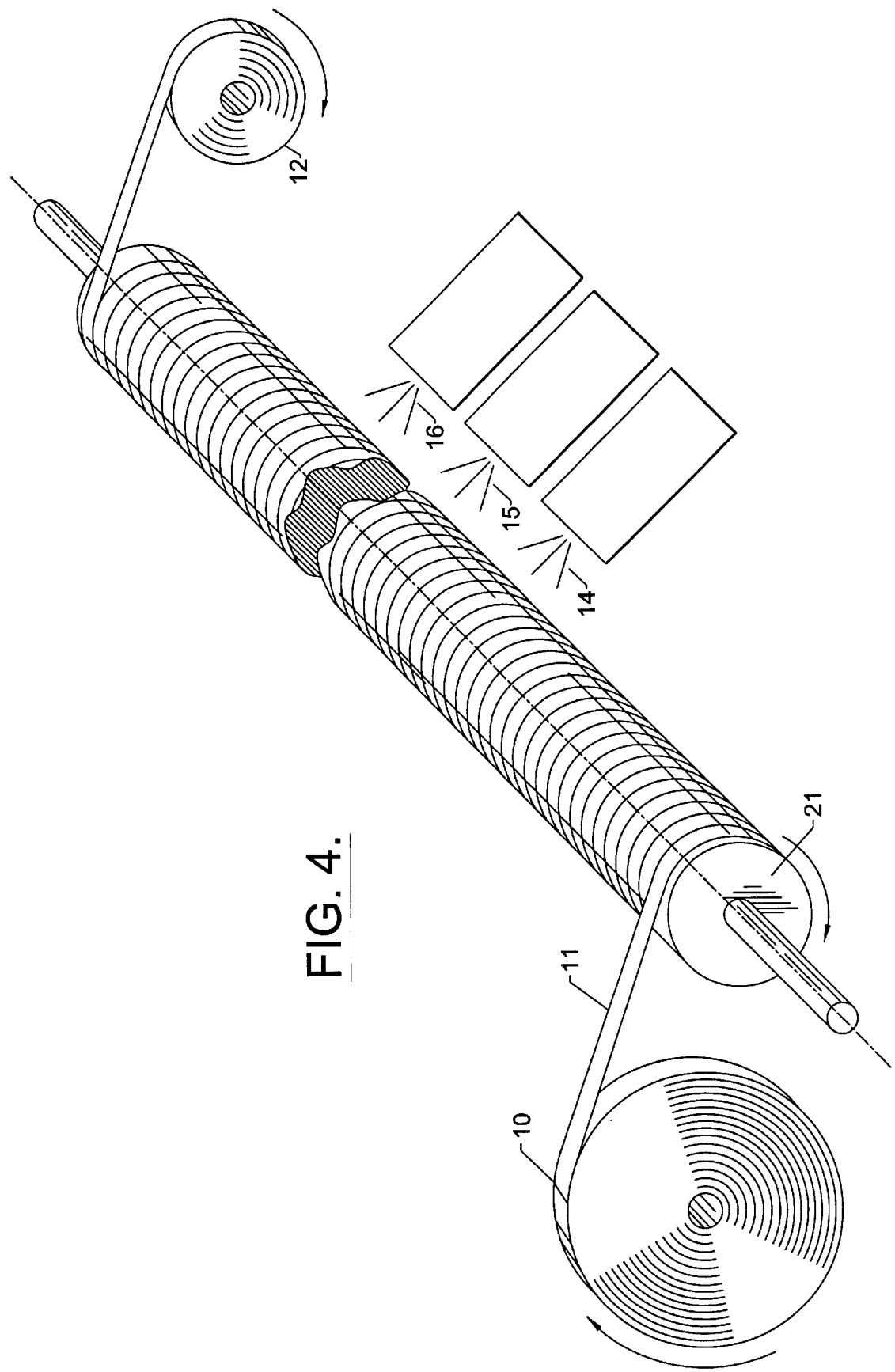
FIG. 4 is a second variation of the surface treating of a metal strip in accordance with the present invention.

FIG. 4 illustrates a further modification of the treating process. In this modification the strip 11 is spirally wound on a rotating cylinder 21 so that it advances along the cylinder 21 and is unwound therefrom and rewound onto the takeup reel 12 after it has progressed a number of revolutions along the rotating cylinder 21. As it progresses along the cylinder 21, the strip 11 is subjected to treatment, such as the same treatment described above in regard to FIG. 1. In this modification the cylinder serves as a heat sink to dissipate heat generated during the treating process as well as imparting curvature to the strip 11.

Figure 5:
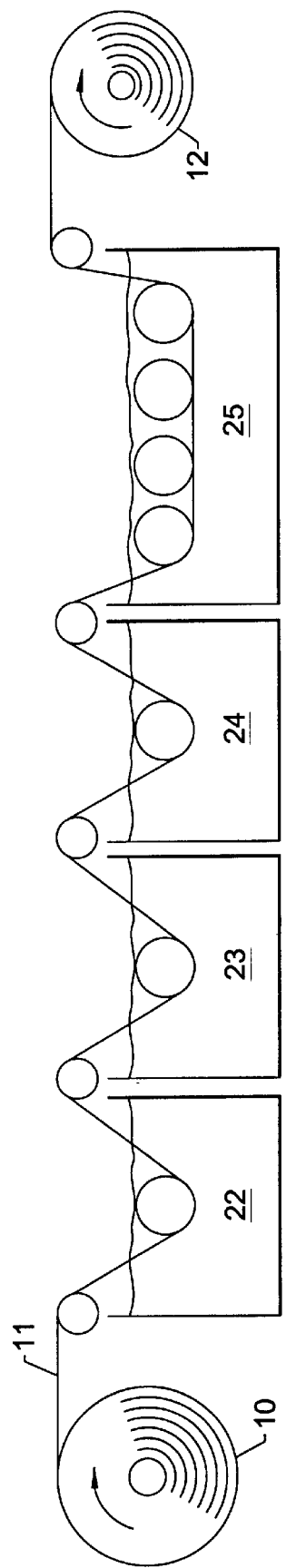
FIG. 5 is a schematic illustration of a third variation of the surface treating of a metal strip in accordance with the present invention.

FIG. 5 illustrates a still further modification of the treating process of the present invention. In this embodiment the treating involves a plating of surface material onto the strip II. In the illustrated embodiment, the strip 11 is passed sequentially through two pretreatment baths 22 and 23 in which it is subjected to an acid and caustic micro-etching. It then passes through a rinse bath 24 and then through a metal ion plating bath 25 with suspended hard particles which applies a metal coating with hard particles suspended therein, following which the strip is wound onto the takeup reel 12. More or less baths may be used as desired. For example, additional rinse baths or more or less pretreatment baths may be utilized.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. A method of resurfacing a traction roll that is used in equipment for transporting sheet material at a manufacturing facility, comprising: providing a supply reel of a narrow, thin, metal strip at a treating location remote from the manufacturing location, continuously unwinding the metal strip from the supply reel at the treating location for continuous travel through a treating station and rewinding onto a takeup reel, thermal spray coating the metal strip as it travels through the treating station, said coating forming a roughened surface on the metal strip, transporting the roughened surface treated reel of metal strip to the manufacturing facility at which the roll to be resurfaced is located, unwinding the roughened surface treated metal strip from the takeup reel, and helically wrapping and removably attaching the metal strip onto the surface of the roll in order to form a roughened surface on the roll.

2. A method of resurfacing a roll that is used in equipment at a manufacturing facility, comprising: providing a supply reel of a narrow, thin, metal strip at a treating location remote from the manufacturing location, continuously unwinding the metal strip from the supply reel at the treating location for continuous travel through a treating station and rewinding onto a takeup reel, the metal strip being fed through the treating location in contact with an arcuate surface of a mandrel to impart curvature to the strip as it is treated, the curvature being in the same general direction as the curvature of the treated strip on the takeup reel, surface treating the metal strip as it travels through the treating station to form a roughened surface thereon, transporting the roughened surface treated reel of metal strip to the manufacturing facility at which the roll to be resurfaced is located, unwinding the roughened surface treated metal strip from the takeup reel, and helically wrapping and removably attaching the metal strip onto the surface of the roll in order to from a roughened surface on the roll.

3. The method of resurfacing a roll according to claim 2 characterized further in that the strip is fed directly from the mandrel to the takeup reel.

4. A method of resurfacing a roll that is used in equipment at a manufacturing facility, comprising: providing a supply reel of a narrow, thin, metal strip at a treating location remote from the manufacturing location, continuously unwinding the metal strip from the supply reel at the treating location for continuous travel through a treating station and rewinding onto a takeup reel, surface treating the metal strip as it travels through the treating station to form a roughened surface thereon, the unwound strip while being treated being fed spirally over a rotating cylinder to impart a curvature to the strip in the same general direction as the curvature of the treated strip on the takeup reel, transporting the roughened surface treated reel of metal strip to the manufacturing facility at which the roll to be resurfaced is located, unwinding the roughened surface treated metal strip from the takeup reel, and helically wrapping and removably attaching the metal strip onto the surface of the roll in order to form a roughened surface on the roll.

5. The method of resurfacing a roll according to claim 1 characterized further in that said treating includes immersing the unwound strip sequentially in a plurality of treating baths.

6. A method of resurfacing a roll according to claim 1 characterized further in that said surface treating includes sequentially preparing the surface of the metal strip and applying one or more coatings to the prepared surface.

7. A method of resurfacing a roll according to claim 1 characterized further by preparing the surface of the roll for wrapping thereon of the metal strip.

8. A method of resurfacing a roll according to claim 1 characterized further in that the attaching of the metal strip to the roll comprises adhering the strip to the surface of the roll.

9. A method of resurfacing a roll according to claim 8 characterized in that the adhering comprises applying doublesided adhesive tape for disposition between and adherence to the surface of the roll and the metal strip.

10. The method of resurfacing a roll according to claim 1 characterized further in that the metal strip is fed through the treating location in contact with an arcuate surface of a mandrel to impart curvature to the strip as it is treated, the curvature being in the same general direction as the curvature of the treated strip on the takeup reel.

11. The method of resurfacing a roll according to claim 10 characterized further in that the strip is fed directly from the mandrel to the takeup reel.

12. The method of resurfacing a roll according to claim 1 characterized further in that the unwound strip while being treated is fed spirally over a rotating cylinder to impart a curvature to the strip in the same general direction as the curvature of the treated strip on the takeup reel.

13. The method of resurfacing a roll according to claim 2 characterized further in that said treating comprises immersing the unwound strip sequentially in a plurality of treating baths.

14. A method of resurfacing a roll according to claim 2 characterized further in that said surface treating comprises sequentially preparing the surface of the metal strip and applying one or more coatings to the prepared surface.

15. A method of resurfacing a roll according to claim 2 characterized further by preparing the surface of the roll for wrapping thereon of the metal strip.

16. A method of resurfacing a roll according to claim 2 characterized further in that the attaching of the metal strip to the roll comprises adhering the strip to the surface of the roll.

17. And a method of resurfacing a roll according to claim 16 characterized further in that the adhering comprises applying double sided adhesive tape for disposition between and adherence to the surface of the roll and the metal strip.

18. The method of resurfacing a roll according to claim 4 characterized further in that said treating comprises immersing the unwound strip sequentially in a plurality of treating baths.

19. A method of resurfacing a roll according to claim 4 characterized further in that said surface treating comprises sequentially preparing the surface of the metal strip and applying one or more coatings to the prepared surface.

20. A method of resurfacing a roll according to claim 4 characterized further by preparing the surface of the roll for wrapping thereon of the metal strip.

21. A method of resurfacing a roll according to claim 4 characterized further in that the attaching of the metal strip to the roll comprises adhering the strip to the surface of the roll.

22. A method of resurfacing a roll according to claim 21 characterized in that the adhering comprises applying doublesided adhesive tape for disposition between and adherence to the surface of the roll and the metal strip.

23. A method of resurfacing a traction member that is used in equipment for transporting sheet material at a manufacturing facility, comprising: providing a supply of a narrow, thin, metal strip at a treating location remote from the manufacturing location, continuously removing the metal strip from the supply at the treating location for continuous travel through a treating station and loading onto a takeup device, thermal spray coating the metal strip as it travels through the treating station, said coating forming a roughened surface on the metal strip, transporting the roughened surface treated metal strip to the manufacturing facility at which the traction member to be resurfaced is located, unloading the roughened surface treated metal strip from the takeup device and removably attaching the metal strip onto the surface of the traction member in order to form a roughened surface on the traction member.

24. A method of resurfacing a traction member that is used in equipment at a manufacturing facility, comprising: providing a supply of a narrow, thin, metal strip at a treating location remote from the manufacturing location, continuously unloading the metal strip from the supply at the treating location for continuous travel through a treating station and loading onto a takeup device, the metal strip being fed through the treating location in contact with a surface of a shaping mandrel to impart a preselected shape to the strip as it is treated, the shape being of the same general shape as the shape of the treated strip on the takeup device, surface treating the metal strip as it travels through the treating station to form a roughened surface thereon, transporting the takeup device with the roughened surface treated metal strip to the manufacturing facility at which the traction member to be resurfaced is located, unloading the surface treated metal strip from the takeup device and removably attaching the metal strip onto the surface of the traction member in order to form a roughened surface on the traction member.

25. A method of resurfacing a roll according to claim 2, wherein said surface treating includes applying heat to the metal strip, said mandrel acting as a heat sink during said surface treating.

26. A method of resurfacing a roll according to claim 4, wherein said surface treating includes applying heat to the metal strip, said rotating cylinder acting as a heat sink during said surface treating.

27. A method of resurfacing a roll according to claim 24, wherein said surface treating includes applying heat to the metal strip, said shaping mandrel acting as a heat sink during said surface treating.

* * * * *